United States Patent
Ernst et al.

(10) Patent No.: US 11,753,083 B2
(45) Date of Patent: Sep. 12, 2023

(54) APPARATUS AND SYSTEM FOR CONTROLLING SEPARATION OF A SUBFRAME FROM A CHASSIS FRAME RAIL

(71) Applicant: Custom Truck One Source, Inc., Kansas City, MO (US)

(72) Inventors: Hayden Ernst, Kansas City, MO (US); Kyle Gerber, Kansas City, MO (US)

(73) Assignee: Custom Truck One Source, Inc., Kansas City, MO (US)

( * ) Notice: Subject to any disclaimer, the term of this patent is extended or adjusted under 35 U.S.C. 154(b) by 88 days.

(21) Appl. No.: 17/647,606

(22) Filed: Jan. 11, 2022

(65) Prior Publication Data
US 2023/0219634 A1 Jul. 13, 2023

(51) Int. Cl.
*B62D 27/02* (2006.01)
*B62D 21/02* (2006.01)
*F16B 7/22* (2006.01)

(52) U.S. Cl.
CPC .......... *B62D 27/023* (2013.01); *B62D 21/02* (2013.01); *F16B 7/22* (2013.01)

(58) Field of Classification Search
CPC ...... B62D 27/02; B62D 27/023; B62D 27/06; B62D 27/065; B62D 21/02; B62D 21/09; F16B 7/22
USPC ............... 296/183.1, 183.2, 35.1, 35.3, 204; 280/781, 797, 800, 107
See application file for complete search history.

(56) References Cited

U.S. PATENT DOCUMENTS

| | | | |
|---|---|---|---|
| 2,339,731 A | 1/1944 | Wheat et al. | |
| 4,699,565 A | 10/1987 | Seaberg | |
| 4,805,539 A | 2/1989 | Ferris et al. | |
| 4,842,326 A * | 6/1989 | DiVito | B60P 3/42 296/10 |
| 5,815,999 A | 10/1998 | Williams | |
| 7,210,874 B2 | 5/2007 | Albritton | |
| 7,699,384 B2 * | 4/2010 | Duerr | B62D 21/02 296/204 |
| 7,896,606 B2 | 3/2011 | Ethington et al. | |
| 9,278,700 B2 | 3/2016 | Forbes et al. | |
| 10,532,778 B2 * | 1/2020 | DeMonte | B62D 21/20 |

FOREIGN PATENT DOCUMENTS

WO 2017063313 4/2017

OTHER PUBLICATIONS

3000 Series Crane, IMT May 20, 2004, https://www.imt.com/wp-content/uploads/2018/04/_PartsSpecs_Pre-2004.pdf.
Palfinger Mechanics Trucks, GeneralTruckBody, Oct. 19, 2021, https://www.generalbody.com/all-products/mechanic-trucks/palfinger-mechanics-trucks/.

* cited by examiner

*Primary Examiner* — Dennis H Pedder
(74) *Attorney, Agent, or Firm* — Lathrop GPM LLP; Robert J. Lambrechts

(57) ABSTRACT

Disclosed is an apparatus for restricting movement between a first structural member and a second structural member. The apparatus includes a hook block welded in position to the first structural member as well as a plate fastened to the second structural member with fasteners. The apparatus also includes a least one knuckle, wherein, the knuckle is pre-welded to the plate and overlaps and engages the hook block restricting movement of the first structural member relative to the second structural member.

13 Claims, 3 Drawing Sheets

APPARATUS AND SYSTEM FOR CONTROLLING SEPARATION OF A SUBFRAME FROM A CHASSIS FRAME RAIL

FIELD OF THE DISCLOSURE

This disclosure is directed to an apparatus and system for controlling the separation of a first structural member from a second structural member due to the application of external forces. More specifically, this disclosure is directed to hardware that is welded to a box beam subframe and hardware that is repositionably fastened to a vehicle chassis and is capable of accommodating changes to the design of the vehicle that impact the originally specified location of the hardware.

BACKGROUND

Heavy equipment, such as truck mounted cranes, experience considerable forces on all structural or load bearing members. All forces encountered by the crane are in effect transferred through the subframe to the chassis of the truck. These forces transferred from the crane subframe to the chassis frame rail must be controlled to prevent dislodging the crane subframe from the chassis frame rail and one device for accomplishing that control is the use of shear plates.

Because subframes for many types of equipment secured to a truck chassis are fabricated from closed box beams the sole use of fasteners to tie the shear plate to the chassis frame rail and prevent vertical separation of the subframe from the chassis cannot readily be accomplished. Box beams, while highly effective as structural members due to their configuration, limit access to the back of the outboard side. Consequently, the portion of the shear plate that extends over the subframe is often welded to the subframe and fastened with threaded fasteners to the chassis frame rail.

In most situations involving heavy vehicle assembly, a subframe arrives from a metal fabricator without the shear plate welded to the box beam. The surface of the box beam at the weld site must be cleaned and prepared and following the welding process the weld area must once again be cleaned of slag, primed, and then painted. These procedures are time consuming, costly and mistakes in positioning the shear plate are desirably avoided. The shear plate is essentially irretrievably locked in place with the weld and repositioning the plate to accommodate hydraulic lines, electrical wiring, additional suspension components or other hardware becomes increasingly complicated. With some frequency, the positioning of the welded shear plate creates challenges for joining the subframe to the chassis. While the positioning of the shear plate on the subframe may have been meticulously specified, design changes do take place that are requested by the purchaser of the finished vehicle. Changes to the location of equipment dictated by client demand may require changes in the positioning of the shear plate.

Changes to the position of the shear plate cannot be easily accommodated because it is welded to the subframe. Consequently, there exists a need for an apparatus, or system, that facilitates attachment of the shear plate along at least a portion of the longitudinal expanse of the subframe. This apparatus or system must be capable of accommodating changes that may occur due to revised customer requirements or design changes that cause interference between the shear plate and other components of the fully assembled vehicle.

SUMMARY

It is an object of the system as disclosed herein to provide an apparatus and system for restricting movement between a first structural member, such as a subframe, and a second structural member, such as a chassis frame rail. The apparatus and system as disclosed herein include a hook block welded in position to the first structural member, a plate fastened to the second structural member with fasteners and a knuckle pre-welded to the plate that overlaps and engages the hook block. This configuration restricts movement of the first structural member relative to the second structural member.

The apparatus and system as disclosed are configured to resist movement of the first structural member relative to the second structural member in not only a transverse, but importantly, a normal (vector) direction. The hook block extends longitudinally along a portion of the subframe and includes a front face, an upper surface, a lower face, and a rear face. The upper surface includes an elevated longitudinally extending rib proximate the front face. The one or more knuckles of the apparatus each include an inner face, longitudinally opposed first and second ends and a main body portion. The first end of the knuckle includes an outwardly extending flange that is orthogonal to the main body portion and includes a downward extension at a distal end.

The plate is optionally fabricated either from three discrete longitudinally extending plate members welded together or a single plate that is formed under pressure or under heat and pressure. Each plate member includes an inner face, an outer face, an upper edge, a lower edge, and opposed side edges. The first plate member includes at least one through hole for securing the plate to the chassis of the vehicle. The second plate member extends diagonally outward from the first plate member at an angle in the range of 10 to 20 degrees.

The third plate member extends upwardly from the second panel member to achieve parallel alignment with the first plate member. The third plate member also extends sufficiently upward to permit the downward extension at the distal end of the outwardly extending flange of the one or more knuckles secured to the plate to overhang the elevated longitudinally extending rib proximate the front face of the upper surface of the hook block. Once the one or more downward extensions of the knuckles are positioned over the rib, the plate with one or more knuckles mounted thereto may be positioned anywhere along the longitudinally extending hook block that avoids interference with equipment associated with the truck chassis or the subframe of the equipment mounted to the chassis.

Once the hook block is positioned at a location that avoids interference with other equipment, i.e., hydraulic lines, electrical equipment, stiffeners, etc., fasteners may be passed through the openings in the plate and through the chassis. Threaded fasteners are preferably employed as they may be removed later should the apparatus disclosed herein need to be removed, repositioned, or replaced.

It is an object of the apparatus and system as disclosed herein to allow positioning of the apparatus along the chassis of the vehicle and the subframe.

It is a further object of the apparatus and system as disclosed herein to avoid welding of a shear plate to a box beam subframe thereby limiting the potential for subsequent repositioning of the shear plate.

It is a further object of the apparatus and system as disclosed herein to rigidly restrain movement between a subframe and a chassis frame rail.

It is a further object of the apparatus and system as disclosed herein to avoid the expense associated with welding a shear plate to the subframe and then preparing the surface for painting and then painting of the area of the weld.

The contents of this summary section are provided only as a simplified introduction to the disclosure and are not intended to be used to limit the scope of the appended claims.

DETAILED DESCRIPTION

Figure 1:
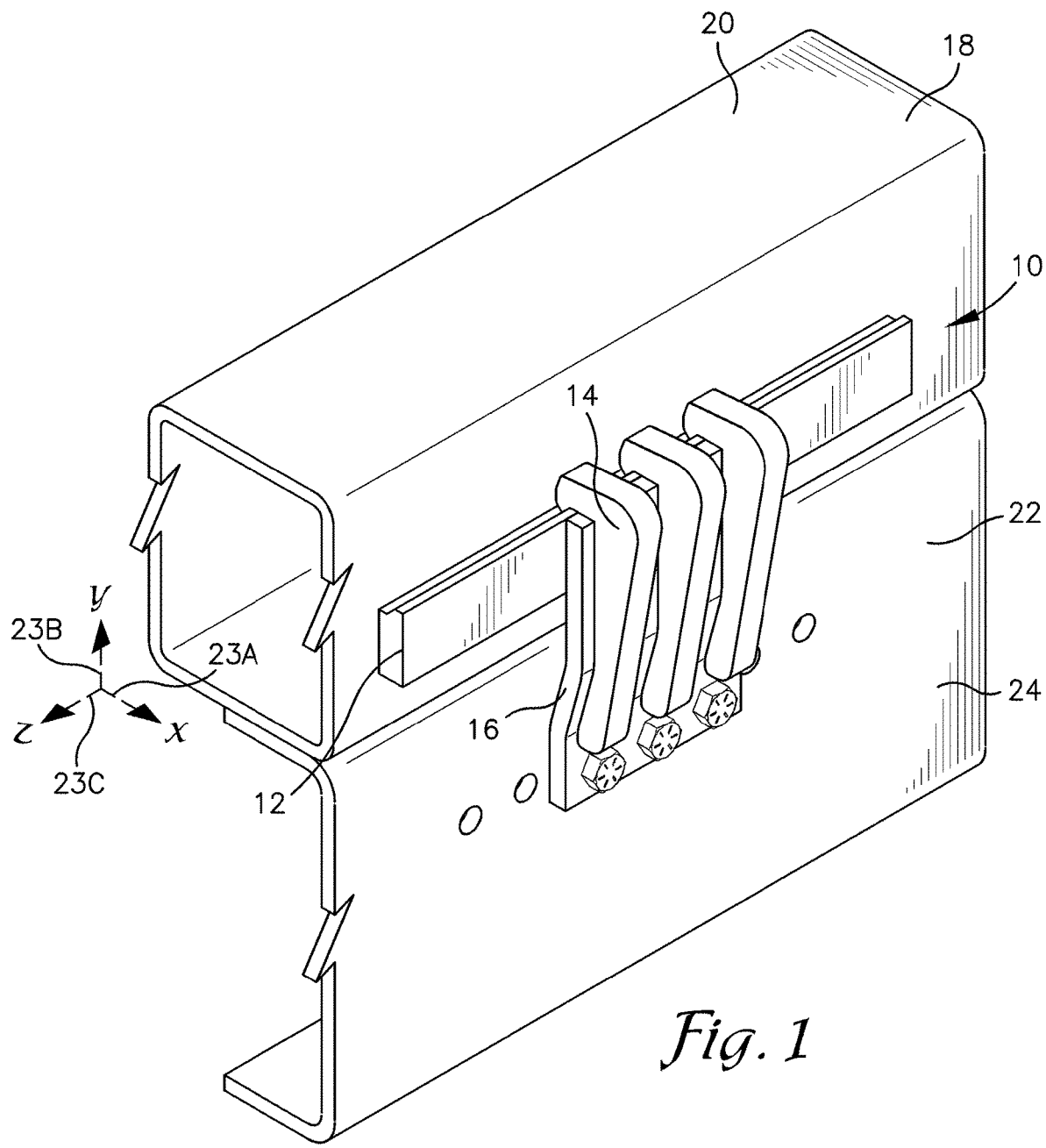
FIG. 1 illustrates an embodiment of the apparatus installed upon a subframe and a chassis frame rail.

FIG. 1 illustrates an embodiment of the restraining apparatus 10 as disclosed herein. The restraining apparatus includes three main components, the hook block 12, one or more knuckles 14 and a plate 16. A typical application of the apparatus 10 is to restrain movement between a subframe 18, such as a subframe of a truck mounted crane 20, and the frame rails 22 of a chassis 24.

Because of the considerable forces experienced by the components 12, 14, 16 of the restraining apparatus 10, the components are preferably fabricated from high tensile strength alloy steel, such as those classified as 4130, 4140 or 4340 pursuant to the numbering system for the American Iron and Steel Institute (AISI).

The objective of the apparatus and system 10 as disclosed herein is to restrict movement between a first structural member, such as a subframe, and a second structural member, such as a chassis frame rail 22 that are experiencing the application of substantial forces seeking to separate the structural members in one or both of a transverse (x-axis 23A as illustrated at FIG. 1) direction and in a normal direction (y-axis 23B as illustrated at FIG. 1). As detailed above, the disclosed apparatus can restrict relative movement between structural members, and specifically structures such as a box beam, without resort to welding a shear plate to the first structural member and using threaded fasteners on the second structural member.

Welding components to structural members particularly at the final assembly site, as discussed above, creates challenges. When structural members must be welded, the weld-surface must be properly cleaned before and after the weld has been completed. The surface of the metal must be primed and then painted before delivery to the customer. The steps of welding, cleaning, priming, and painting all require time and lead to additional personnel and materials costs that are either passed onto the customer or are absorbed by the entity responsible for final assembly. The apparatus and system disclosed herein avoids these fabrication delays and additional costs with a unique combination of just three components that not only eliminate the above referenced time-consuming activities and their associated costs, but importantly adds flexibility to the process of positioning the restraining apparatus 10.

Figure 2:
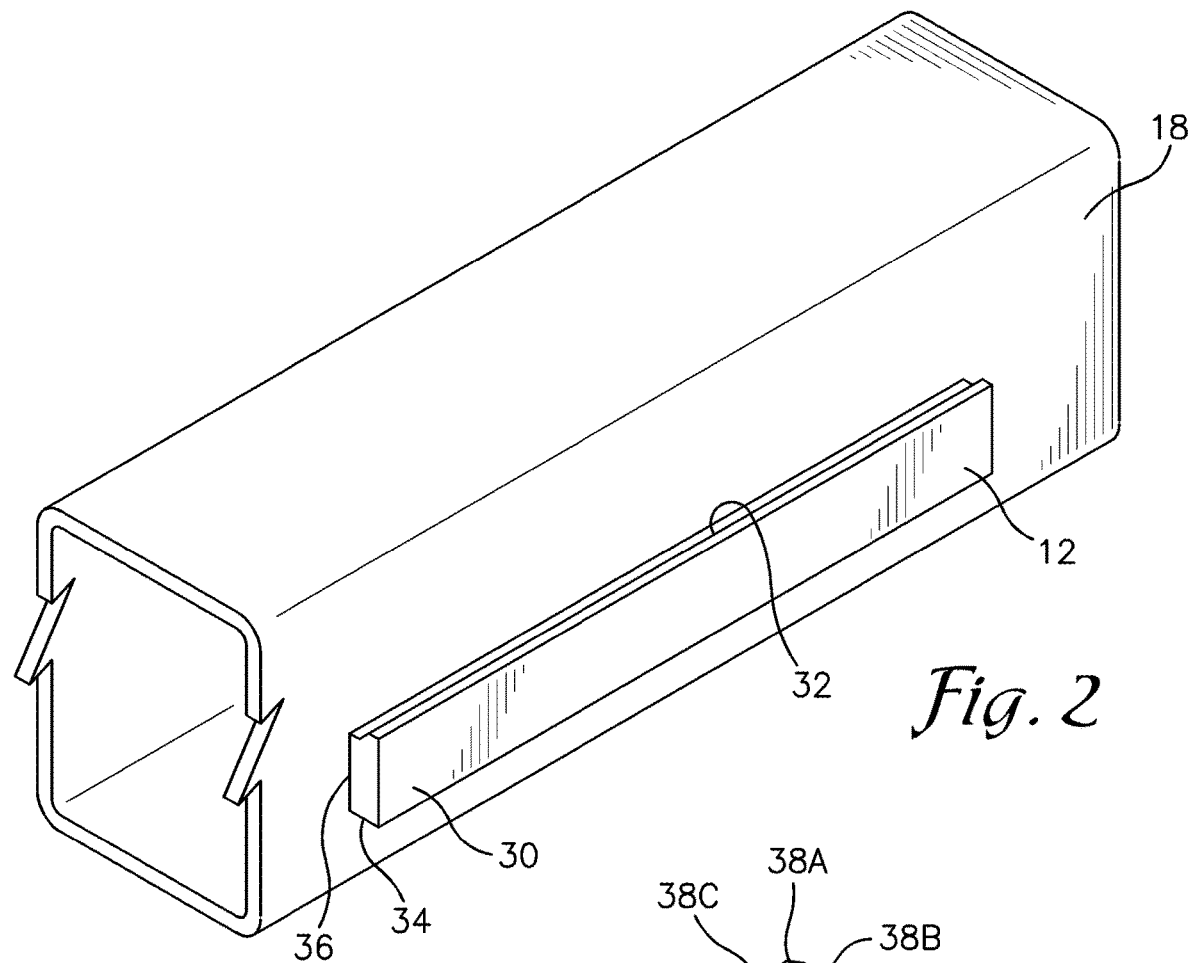
FIG. 2 illustrates a perspective view of an embodiment of a hook block welded to a subframe.

As illustrated at FIG. 2, the hook block 12 welded in position to the first structural member, such as a subframe 18. The welding of the hook block 12 may optionally be performed at the metal fabrication facility, or the final assembly facility. The location of welding of the hook block 12 is specified by the final assembly facility.

The hook block 12, when installed, extends longitudinally along a portion of the subframe 18 and includes a front face 30, an upper surface 32, a lower face 34 and a rear face 36. The hook block 12 preferably extends longitudinally in the range of about 12 to 20 inches with a preferred longitudinal span of about 16 inches. The hook block is also preferably about 0.75 inches in width with a height ranging from 1.5 to 2.0 inches. This thickness and height provide sufficient structural rigidness to the hook block 12 to prevent deformation of the block when experiencing substantial loads.

Figure 3:
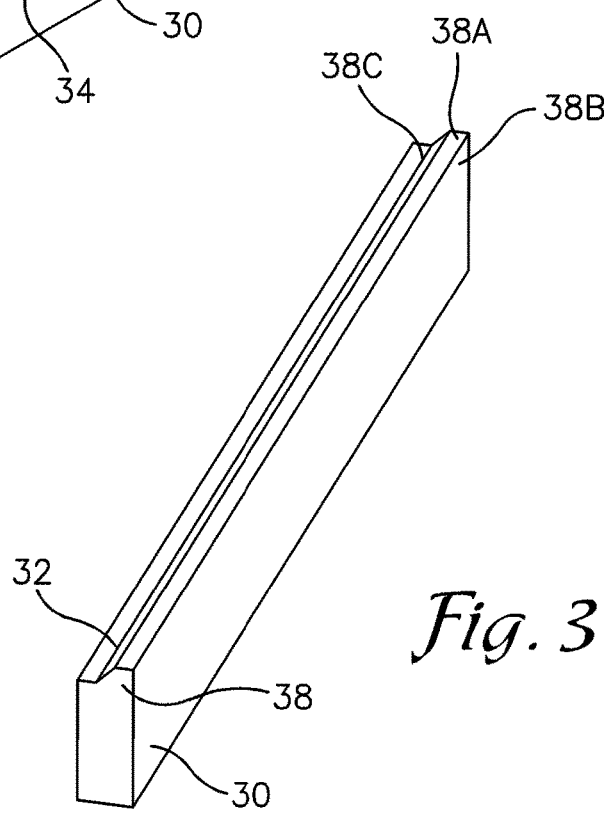
FIG. 3 illustrates a perspective view of an embodiment of a hook block.

As illustrated at FIG. 3, the upper surface 32 of the hook block 12 includes an elevated longitudinally extending rib 38 proximate the front face 30. The longitudinally extending rib 38 includes a flat upper surface 38A, a front face 38B and a canted back surface 38C. The back surface 38C is preferably canted at an angle in the range of 30 to 60 degrees. An exemplary cant angle for the back surface 38C is 45 degrees which allows for precise alignment, as detailed below, with the knuckle 14.

Figure 4:
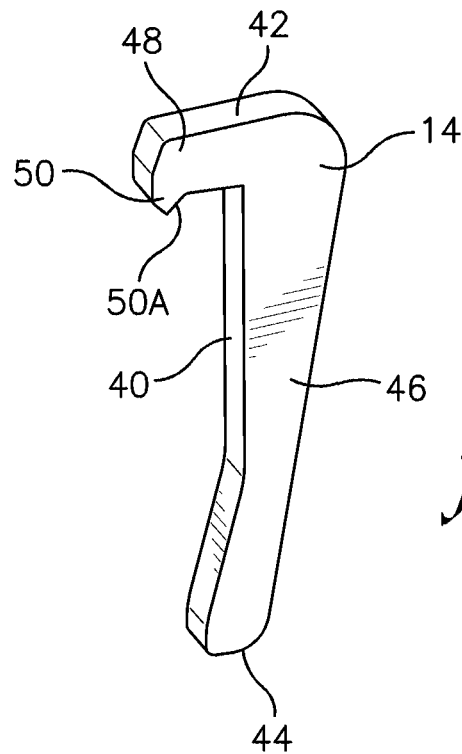
FIG. 4 illustrates a perspective view of an embodiment of a knuckle.

As illustrated at FIG. 4, the one or more knuckles 14 of the apparatus 10 each include an inner face 40, longitudinally opposed first and second ends 42, 44 and a main body portion 46. The first end 42 of each knuckle 14 includes an outwardly extending flange 48 that is orthogonal to the main body portion 46 and includes a downward extension 50 at a distal end 52. The downward extension 50 has an interior surface 50A that is canted at an angle of about 45 degrees from vertical and is oriented to align with the back surface 38C of the longitudinally extending rib 38. The back surface 38C of the longitudinally extending rib 38 acting in unison with the interior surface 50A of the downward extension 50 restricts movement of the subframe relative to the chassis frame rail 22 in both transverse (x) and normal (y) directions.

Figure 5:
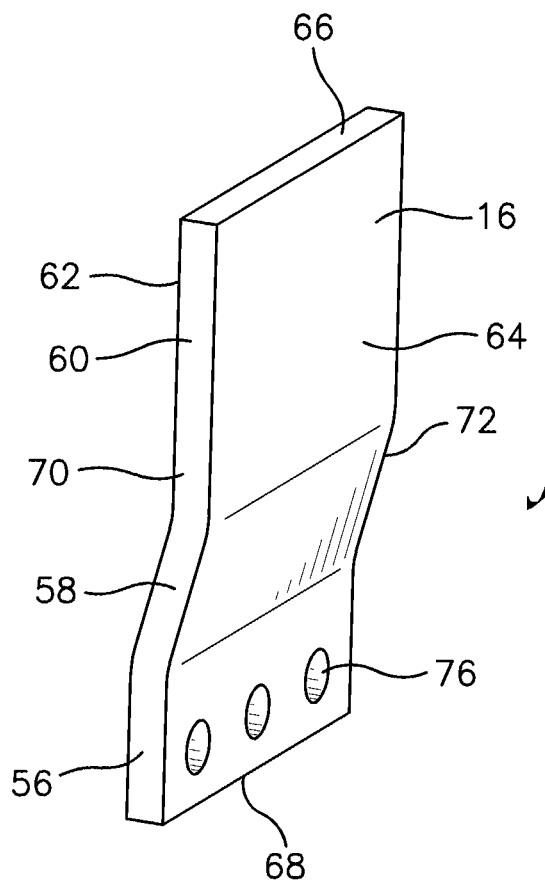
FIG. 5 illustrates a perspective view of an embodiment of a plate.

As illustrated at FIG. 5, the plate 16 is optionally fabricated either from three discrete longitudinally extending plate members 56, 58, 60 welded together or a single plate that is formed under pressure or under heat, and pressure. Each plate member 56, 58, 60 includes an inner face 62, an outer face 64, an upper edge 66, a lower edge 68 and opposed side edges 70, 72. The first plate member 56 includes at least one through hole 76 for securing the plate 16 to the frame rail 22 of the vehicle. The second plate member 58 extends diagonally outward from the first plate member 56 preferably at an angle in the range of 10 to 20 degrees and most preferably at about 15 degrees.

The third plate member 60 extends upwardly from the second plate member 58 to achieve parallel planar alignment with the first plate member 56. The third plate member 60 also extends sufficiently upward to permit the downward extension 50 at the distal end 52 of the outwardly extending flange 48 of the one or more knuckles 14 secured, preferably by welding, to the plate 16 to overhang the elevated longitudinally extending rib 38 proximate the front face 30 of the upper surface 32 of the hook block 12. Once the one or more downward extensions 50 of the knuckles 14 are positioned over the rib 38, the plate 16 with one or more knuckles 14 mounted thereto may be positioned anywhere along the longitudinally extending hook block 12 to avoid interference with existing, or anticipated, equipment associated with the truck chassis 24 or the subframe 18 of the equipment mounted to the chassis.

Referring again to FIG. 1, once the hook block 12 is positioned at a location that avoids interference with other equipment, i.e., hydraulic lines, electrical equipment, linkages, suspension components, etc., fasteners 70 may be passed through the openings in the plate 16 and through the chassis frame rail 22. Threaded fasteners 70 are preferably employed as they may be removed later should the apparatus disclosed herein need to be removed, repositioned, or replaced.

Once the fasteners 70 are tightened into position through the plate 16 and into the chassis frame rail 22 the apparatus 10 is in place and can restrict both transverse and normal movement of the subframe relative to the chassis frame rail 22. The knuckles 14 overlap the elevated longitudinally extending rib 38 proximate the front face 30 of the upper surface 32 of the hook block 12 and are immovable as they are welded to the front face of each of the three plate members 56, 58, 60. The immovable status of the knuckles 14 is due to their being welded to the plate members 56, 58, 60 and the first plate member 56 being secured with fasteners to the chassis frame rail 22.

Although the invention has been described above with reference to one or more preferred embodiments, it will be appreciated that various changes or modifications may be made without departing from the scope of the invention as defined in the appended claims.

In view of the many possible embodiments to which the principles of the disclosed invention may be applied, it should be recognized that the illustrated embodiment is only an example of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. An apparatus for restricting movement between a first structural member and a second structural member, the apparatus comprising:
   (i) a hook block welded in position to a planar wall of the first structural member;
   (ii) a plate fastened to the second structural member with fasteners, wherein the plate comprises first, second and third plate members, the second plate member extending outwardly from the first plate member at an angle in the range of 10 to 20 degrees and the third plate member extending outwardly from the second plate member in a plane parallel to the first plate member; and
   (iii) at least one knuckle; wherein,
   the at least one knuckle is pre-welded to the plate and overlaps and engages the hook block restricting movement of the first structural member relative to the second structural member.

2. The apparatus of claim 1, wherein the movement of the first structural member relative to the second structural member is at least one of (i) transverse movement, and (ii) normal movement.

3. The apparatus of claim 1, wherein the hook block extends longitudinally along a portion of the first structural member and comprises a front face, an upper surface, a lower face and a rear face, the upper surface further comprising an elevated longitudinally extending rib proximate the front face.

4. The apparatus of claim 3, wherein the at least one knuckle comprises a main body portion, the main body portion further comprising an inner face, an outer face and longitudinally opposed first and second ends, wherein the first end comprises an outwardly extending flange orthogonal to the main body portion with a downward extension at a distal end.

5. The apparatus of claim 4, wherein the downward extension of the at least one knuckle overlaps the elevated longitudinally extending rib of the hook block prior to fastening to the second structural member.

6. The apparatus of claim 1, wherein the first plate member comprises at least one through hole.

7. The apparatus of claim 1, wherein an inner face of the at least one knuckle is disposed adjacent an outer face of each of the first, second and third plate members.

8. A system for restricting movement of a subframe relative to a truck frame rail, the system comprising:
   a hook block welded into position against a wall of the subframe, the wall being planar;
   a plate fastened to the frame rail with fasteners; and
   at least one knuckle; wherein,
   the at least one knuckle is welded to the plate and overlaps and engages the hook block restricting movement of the subframe relative to the frame rails.

9. The system of claim 8, wherein the subframe is disposed atop the frame rails.

10. The system of claim 8, wherein the frame rail is comprised of a C-channel member.

11. The system of claim 8, wherein the hook block extends longitudinally along a portion of the subframe and comprises a front face, an upper surface, a lower face and a rear face, the upper surface further comprising an elevated longitudinally extending rib proximate the front face.

12. The system of claim 8 wherein the at least one knuckle comprises an outer face, opposing side faces and an inner face.

13. The system of claim 8, wherein at least two fasteners pass through the frame rail and secure the plate to the frame rail.

* * * * *